Figure 1:
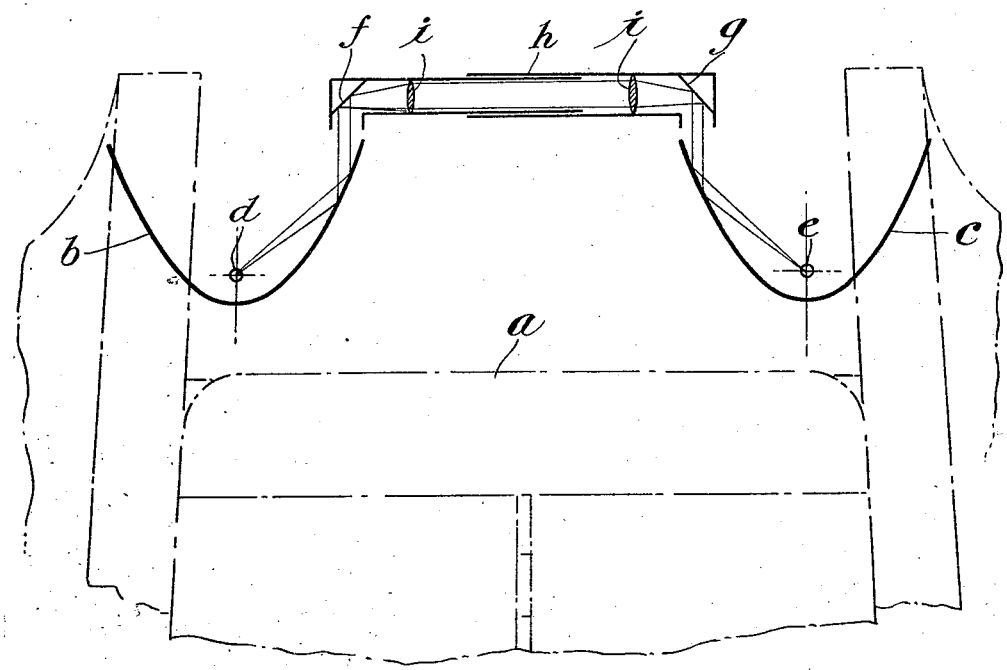

April 23, 1929.  G. W. BURTON  1,709,931

LIGHTING FIXTURE

Filed April 8, 1927

INVENTOR
George W Burton
BY
ATTORNEY

Patented Apr. 23, 1929.

1,709,931

UNITED STATES PATENT OFFICE.

GEORGE W. BURTON, OF LARCHMONT, NEW YORK.

LIGHTING FIXTURE.

Application filed April 8, 1927. Serial No. 181,931.

This invention relates generally to lighting fixtures and has more particularly reference to the headlights used on an automobile, although I wish it to be distinctly understood that the invention is not limited in its application to automobiles.

In the art, as heretofore practiced, it is the custom to have two headlights on automobiles, one adjacent each side thereof, while on motorcycles only one headlight is used. Drivers therefore frequently, and as a matter of habit, interpret one light to mean a motorcycle and two lights to mean an automobile. It not infrequently occurs, however, that one of the headlights of an automobile fails or becomes extinguished thus giving the appearance of a motorcycle to a driver coming in the opposite direction. This condition becomes particularly dangerous if the left-hand headlight fails and has resulted in the occurrence of a number of accidents.

The main object and feature of this invention is to provide means whereby if one headlight becomes extinguished the light source contained within the other may be used to illuminate both headlights.

The figure is a diagrammatic view of the front end of an automobile with the headlights indicated embodying one form of the invention.

In the figure the reference numeral $a$ indicates the front end of an automobile. $b$ and $c$ indicate two reflectors here spaced apart and facing in the same general direction, each reflector having a light source $d$ and $e$. Suitable means to intercept a portion of the light rays issuing from one reflector and to transmit it to the other one for re-reflection are provided, such means in the present instance taking the form of a mirror $f$ and $g$ at the adjacent sides of the reflectors. It will be understood that should one of the sources of light fail, say $d$, then certain of the rays from reflector $c$ would be intercepted by mirror $g$ and would be transmitted to mirror $f$ which in turn would illuminate reflector $b$, and that this would be done without materially robbing $c$ of its light; that is without destroying its function as a headlight. Conversely, should light $e$ fail then certain of the rays from reflector $b$ would be transmitted to reflector $c$. The device can, of course, be made as elaborate as may be desired. For instance, a telescoping tube $h$ can be employed in which mirrors $f$ and $g$ can be mounted and this tube can, if desired, be provided with lenses $i$. The object of this form of the invention is to enable a separate unit to be made which can be applied to existing cars with but slight labor.

I claim:

A headlight equipment including two reflectors, each having a light source, spaced apart and facing in substantially the same direction, a telescoping tube independent of the reflectors and located at their adjacent sides, and means carried by said tube to intercept a portion of the light rays issuing from either reflector and to transmit it to the other reflector for re-reflection.

Signed at 233 Broadway, in the county of New York, and State of New York, this 30th day of March, 1927.

GEORGE W. BURTON.